United States Patent
Buskens et al.

(10) Patent No.: US 7,509,630 B2
(45) Date of Patent: *Mar. 24, 2009

(54) SOFTWARE COMPONENT INITIALIZATION IN AN ORDERED SEQUENCE

(75) Inventors: Richard W. Buskens, Robbinsville, NJ (US); Oscar J. Gonzalez, Bridgewater, NJ (US); Li Kuang, Lisle, IL (US); Tim T. Liim, Holmdel, NJ (US); Yow-Jian Lin, Edison, NJ (US); Sunil K. Mishra, Aurora, IL (US); Pravish Prabhakar, Lisle, IL (US); Muhammad A. Siddiqui, Monmouth Junction, NJ (US); Timothy A. Suchaczewski, Somonauk, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 697 days.

This patent is subject to a terminal disclaimer.

(21) Appl. No.: 10/867,945

(22) Filed: Jun. 14, 2004

(65) Prior Publication Data
US 2005/0278688 A1 Dec. 15, 2005

(51) Int. Cl.
*G06F 9/44* (2006.01)
*G06F 13/00* (2006.01)
*G06F 15/16* (2006.01)

(52) U.S. Cl. ............... 717/106; 719/328; 709/201
(58) Field of Classification Search ............... 717/106; 719/328; 709/201
See application file for complete search history.

(56) References Cited

U.S. PATENT DOCUMENTS

| | | | | |
|---|---|---|---|---|
| 5,611,031 | A | * | 3/1997 | Hertzfeld et al. ............ 715/740 |
| 6,115,830 | A | * | 9/2000 | Zabarsky et al. ............. 714/15 |
| 6,321,374 | B1 | * | 11/2001 | Choy ......................... 717/106 |
| 6,377,939 | B1 | * | 4/2002 | Young ........................ 705/34 |
| 6,408,399 | B1 | * | 6/2002 | Baughman ..................... 714/4 |
| 6,766,471 | B2 | * | 7/2004 | Meth .......................... 714/16 |
| 6,883,170 | B1 | * | 4/2005 | Garcia ......................... 718/1 |
| 7,246,256 | B2 | * | 7/2007 | De La Cruz et al. ............ 714/4 |
| 2002/0188711 | A1 | * | 12/2002 | Meyer et al. ................ 709/223 |
| 2003/0058796 | A1 | * | 3/2003 | Anderson, Sr. ............. 370/236 |

* cited by examiner

*Primary Examiner*—Tuan Q Dam
*Assistant Examiner*—James Rutten

(57) ABSTRACT

A manager component of an apparatus in one example initializes a plurality of software components of a distributed software application, within one or more executables, in an ordered sequence based on one or more dependency relationships among the plurality of software components.

20 Claims, 2 Drawing Sheets

SOFTWARE COMPONENT INITIALIZATION IN AN ORDERED SEQUENCE

CROSS-REFERENCE TO RELATED APPLICATIONS

This application contains subject matter that is related to the subject matter of the following applications, which are assigned to the same assignee as this application. The below listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., patent application Ser. No. 10/868,128, co-filed herewith;

"SELECTING A PROCESSOR TO RUN AN EXECUTABLE OF A DISTRIBUTED SOFTWARE APPLICATION UPON STARTUP OF THE DISTRIBUTED SOFTWARE APPLICATION," by Buskens, et al., patent application Ser. No. 10/868,404, co-filed herewith;

"SHUTTING DOWN A PLURALITY OF SOFTWARE COMPONENTS IN AN ORDERED SEQUENCE," by Buskens, et al., patent application Ser. No. 10/868,142, co-filed herewith;

"DISTRIBUTED SOFTWARE APPLICATION SOFTWARE COMPONENT RECOVERY IN AN ORDERED SEQUENCE," by Buskens, et al., patent application Ser. No. 10/867,590, co-filed herewith;

"MANAGER COMPONENT FOR CHECKPOINT PROCEDURES," by Buskens, et al., patent application Ser. No. 10/868,127, co-filed herewith;

"MANAGER COMPONENT THAT CAUSES FIRST SOFTWARE COMPONENT TO OBTAIN INFORMATION FROM SECOND SOFTWARE COMPONENT," by Buskens, et al., patent application Ser. No. 10/868,469, co-flied herewith;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskens, et al., patent application Ser. No. 10/867,946, co-filed herewith;

"MANAGER COMPONENT RESOURCE ADDITION AND/OR RESOURCE REMOVAL ON BEHALF OF DISTRIBUTED SOFTWARE APPLICATION," by Gong, et al., patent application Ser. No. 10/868,144, co-filed herewith.

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskens, et al., patent application Ser. No. 10/868,472, co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. For distributed software applications to work, the software components of the executables need to interact with each other. Many executables comprise dependency relationships with other software components of the distributed software application. The dependency relationships must be accounted for when initializing the distributed software application. For example, where a first executable is dependent on a second executable, the first executable must wait until the second executable has finished initialization before continuing with its own initialization. Initialization of the executables of the distributed software application must take place in an ordered sequence based on the dependency relationships between the software components.

As one shortcoming, the software developer must create extra software within the first and second executables to cause the initialization of the first executable to occur after the second executable has finished initialization.

Thus, a need exists to alleviate executables of the responsibility of initialization within an ordered sequence.

SUMMARY

In one embodiment, there is provided an apparatus comprising a manager component. The manager component initializes a plurality of software components of a distributed software application, within one or more executables, in an ordered sequence based on one or more dependency relationships among the plurality of software components.

In another embodiment, there is provided a method for initializing a plurality of software components of a distributed software application, within one or more executables, in an ordered sequence based on one or more dependency relationships among the plurality of software components.

In yet another embodiment, there is provided an apparatus comprising a high availability infrastructure in communication with a distributed software application that comprises a plurality of software components within a plurality of executables. The high availability infrastructure comprises a manager component responsible for one or more of the plurality of software components. The manager component causes an initialization of the one or more of the plurality of software components in an ordered sequence based on one or more dependency relationships among the plurality of software components.

DESCRIPTION OF THE DRAWINGS

Features of exemplary implementations of the invention will become apparent from the description, the claims, and the accompanying drawings in which:

DETAILED DESCRIPTION

Figure 1:
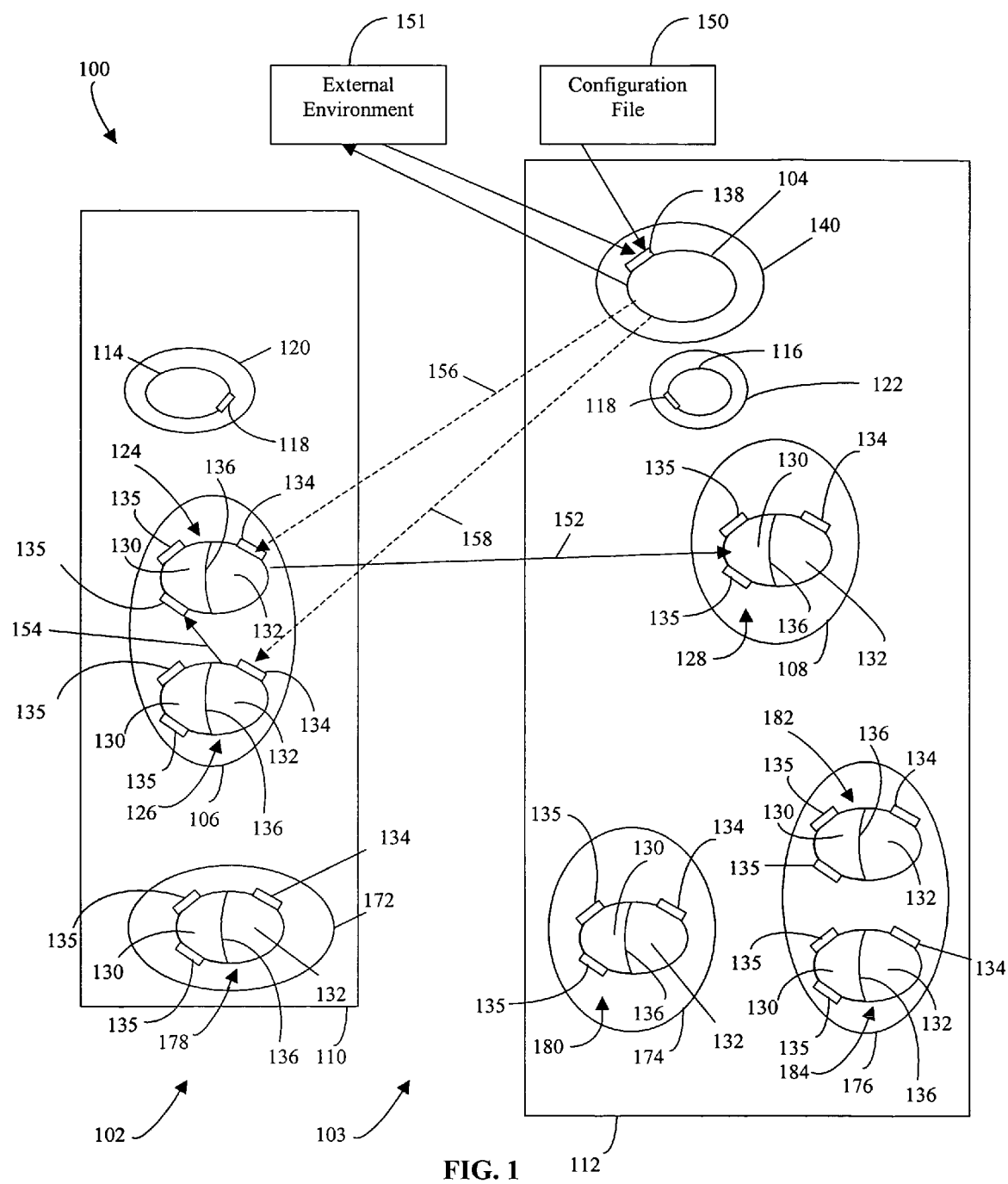
FIG. 1 is a representation of an exemplary implementation of an apparatus that comprises a distributed software application and one or more manager components.

Turning to FIG. 1, an apparatus 100 in one example comprises a distributed software application 102 and one or more management infrastructures 103. The distributed software application 102 represents a software application divided among a plurality of executables (i.e., software capsules or software entities). For example, the distributed software application 102 comprises a plurality of executables 106, 108, 172, 174 and 176. The distributed software application 102 may run on a single central processing unit ("CPU") or may be divided between multiple CPUs. For example, the executable 106 may run on a processor 110 and the executable 108 may run on a processor 112.

The executables 106, 108, 172, 174 and 176 comprise one or more software components 124, 126, 128, 178, 180, 182 and 184 of the distributed software application 102, as described herein. For example, the executable 106 encapsulates the software components 124 and 126 and the executable 108 encapsulates the software component 128. Within each of the executables 106, 108, 172, 174 and 176 may be tens, hundreds, or even thousands of other software components (e.g., analogous to the software components 124, 126, 128, 178, 180, 182 and 184).

The distributed software application 102 comprises a plurality of software components, for example, the software components 124, 126, 128, 178, 180, 182 and 184. The software components 124, 126, 128, 178, 180, 182 and 184 represent software sub-entities of the executables 106, 108, 172, 174 and 176. For example, the software components 124, 126, 128, 178, 180, 182 and 184 represent logical software blocks and/or software objects. The software components 124 and 126 in one example are developed independently and then put together within the executable 106. For example, the software components 124 and 126 are compiled into the executable 106. The distributed software application 102 may provide any functionality for a computer system. The distributed software application 102 in one example comprises a call processing software application. For example, the distributed software application 102 sets up and/or tears down telecommunication sessions in a telecommunication network.

The management infrastructure 103 performs one or more management procedures for the distributed software application 102. For example, the management infrastructure 103 provides a reusable software framework for one or more management procedures. For example, the management infrastructure 103 handles one or more of starting, stopping, initializing, and monitoring the distributed software application 102, detecting failures of the distributed software application 102, recovering the distributed software application 102, propagating state changes about the distributed software application 102, establishing communication channels between the software components 124, 126, 128, 178, 180, 182 and 184, and the like.

The management infrastructure 103 in one example comprises one or more manager components 104, one or more executable managers 114 and 116 and/or one or more management support components 132. The management infrastructure 103 may run on one or more of the processors 110, 112, and/or a remote processor (not shown). The manager component 104 in one example handles startup, shutdown, initialization, failure detection, recovery, and other functions for the distributed software application 102, as will be appreciated by those skilled in the art.

One or more of the components of the management infrastructure 103, for example, the manager component 104, the executable managers 114 and 116, and the management support software 132 of the software components 124, 126, 128, 178, 180, 182 and/or 184, in one example detect one or more failures and/or faults of the distributed software application 102 and/or the management infrastructure 103. In one example, the software component 124 of the distributed software application 102 returns a response to the manager component 104 during initialization that indicates an error. In another example, the manager component 104 employs a timer to determine a timeout for a message response. For example, the manager component 104 determines an error has occurred if it has not received a message response from the software component 124 within a pre-determined time interval, for example, thirty seconds. The components of the management infrastructure 103 in one example communicate through employment of a fault-tolerant and/or redundant messaging protocol. For example, the fault-tolerant messaging protocol comprises handshake procedures, delivery confirmations, message timeouts, fault detection procedures, and fault escalation procedures, as will be appreciated by those skilled in the art.

The manager component 104 comprises a communication interface 138 for receiving incoming communications. The communication interface 138 is employable for receiving a configuration file 150 for the distributed software application 102. The manager component 104 may employ other means to receive the configuration file 150, such as reading the configuration file 150 directly from a disk or file system. The manager component 104 may also use the communication interface 138 for receipt of external system information from an external environment 151. The external environment 151 in one example represents other components of the system that are in communication with the manager component 104. The communication interface 138 may also receive communications from the executable managers 114 and 116, as well as communications from the software components 124, 126, 128, 178, 180, 182 and 184. The manager component 104 is encapsulated with zero or more other software components in an executable 140. The executable 140 that contains the manager component 104 may be run on either of the processors 110 and 112.

The manager component 104 in one example establishes one or more communication channels between the software components 124, 126, 128, 178, 180, 182 and 184. In one example, the manager component 104 establishes a communication channel 152 between the software component 124 and the software component 128. In another example, the manager component 104 establishes a communication channel 154 between the software component 126 and the software component 124. The manager component 104 sends one or more messages, for example, the messages 156 and 158, to the management support software 130 of the software components 124 and 126, respectively, to establish the communication channels 152 and 154.

The executable managers 114 and 116 comprise a communication interface 118 for communication with the manager component 104. The executable managers 114 and 116 in one example receive instruction from the manager component 104. For example, the executable managers 114 and 116 may receive instructions at the communication interface 118 from the manager component 104. The executable managers 114 and 116 in one example are encapsulated in an executable 120 and an executable 122, respectively.

The executable managers 114 and 116 monitor executables and/or software components of the distributed software application 102 that run on the processors 110 and 112, such as the executables 106, 108, 172, 174 and 176 and the software components 124, 126, 128, 178, 180, 182 and/or 184. For example, the executable managers 114 and 116 monitor communication channels and/or diagnostics on behalf of the executables 106, 108, 172, 174 and 176, and the software components 124, 126, 128, 178, 180, 182 and 184. Should one or more of the executables 106, 108, 172, 174 and 176 and/or the software components 124, 126, 128, 178, 180, 182 and 184 fail, the respective executable manager informs the manager component 104 of the failure.

In one example, the management infrastructure 103 comprises one executable manager per processor. For example, the executable 120 of the executable manager 114 runs on the processor 110. The executable manager 114 monitors the executables 106 and 172 and the software components 124, 126 and 178. The executable 122 of the executable manager 116 runs on the processor 112. The executable manager 116 monitors the executables 108, 174 and 176 and the software components 128, 180, 182 and 184.

Each of the software components 124, 126, 128, 178, 180, 182 and 184 comprise application software 130, management support software 132, a management support software communication interface 134, and one or more application software communication interfaces 135. The software components 124, 126, 128, 178, 180, 182 and 184 employ the management support software communication interface 134 to receive communications from the manager component 104. The software components 124, 126, 128, 178, 180, 182 and 184 employ the application software communication interfaces 135 to receive communications from other software components of the software components 124, 126, 128, 178, 180, 182 and 184. An application programming interface ("API") 136 communicatively couples the application software 130 with the management support software 132 in each of the software components 124, 126, 128, 178, 180, 182 and 184. The application software 130 and the management support software 132 can exchange information through the application programming interface 136. The manager component 104 in one example generates the application programming interface 136 through employment of a code generator.

The software components 124, 126, 128, 178, 180, 182 and 184 each perform some portion of the overall functionality of the distributed software application 102. The software components 124, 126, 128, 178, 180, 182 and 184 work together to make the distributed software application 102 achieve the desired operation. For example, the software components 124, 126, 128, 178, 180, 182 and 184 process incoming requests from each other and perform operations to provide the overall functionality.

An application developer creates the application software 130 of the software components 124, 126, 128, 178, 180, 182 and 184 to perform the designated functionality of the software components 124, 126, 128, 178, 180, 182 and 184. For example, the application developer creates the application software 130 of the software components 124, 126, 128, 178, 180, 182 and 184 to achieve the overall functionality of the distributed software application 102. The management support software 132 of the software components 124, 126, 128, 178, 180, 182 and 184 communicatively couples the software components 124, 126, 128, 178, 180, 182 and 184 to allow the application software 130 to perform the functionality of the distributed software application 102.

To alleviate the application developers from being required to write software into each of the software components 124, 126, 128, 178, 180, 182 and 184 for the management procedures, the manager component 104, the executable managers 114 and 116, and the management support software 132 cooperate to perform the management procedures for the software components 124, 126, 128, 178, 180, 182 and 184. A code generator of the management infrastructure 103 in one example automatically generates the management support software 132. The code generator of the management infrastructure 103 employs the configuration file 150 to create the management support software 132. For example, the configuration file 150 comprises connection information and/or architecture information of the distributed software application 102. The code generator creates code for the management support software 132. The code for the management support software 132 is compiled and linked with the application software 130 in the software components 124, 126, 128, 178, 180, 182 and 184. The management support software 132 may be different for each of the software components 124, 126, 128, 178, 180, 182 and 184, as will be appreciated by those skilled in the art.

One or more of the manager component 104, the executable managers 114 and 116, and/or the software components 124, 126, 128, 178, 182, 184 and 180 in one example comprise a portion of an active/standby group. Each active/standby group comprises a first component (i.e. active component) and a second component (i.e. standby component). The first component performs a portion of the overall functionality of the distributed software application 102 or the management infrastructure 103 while the second components remain inactive. Upon a failure of the first component, the second component is promoted to an active status. For example, the standby component becomes an active component and begins to perform the portion of the overall functionality. The standby component provides a redundancy in operation of the distributed software application 102 and/or the management infrastructure 103. The active/standby group promotes a reduction in downtime for the distributed software application 102 and/or the management infrastructure 103, as will be appreciated by those skilled in the art.

Initialization of the software components 124, 126 and 128 in one example comprises a plurality of steps. A first step comprises creation of the software component 124. For example, where the software component 124 comprises a data structure, the first step comprises creation of the data structure in memory of the processor 110. A second step comprises establishing communication channels to the software component 124. For example, establishing a communication channel to allow the software component 126 to set and/or retrieve a value of the data structure. A third step comprises setting the value of the data structure. For example, setting the value of the data structure to a pre-determined value.

Where the software components 124, 126 and 128 comprise one or more dependency relationships, initialization of the software components 124, 126 and 128 must take place in an ordered sequence, as described herein. Exemplary conditions for a dependency relationship comprise shared state information, communication channels between software components, and dependencies from the external environment 151. In one example, before a communication channel between the software component 124 and the software component 128 can be established, both the software component 124 and the software component 128 must be created. In another example, before a shared value for the software component 126 can be retrieved from the software component 124, the software component 124 must have the shared value set. In yet another example, before the software component 124 can be initialized, the manager component 104 must receive a message from the external environment 151. For example, the message confirms to the manager component 104 that an external executable or component is ready, as will be appreciated by those skilled in the art.

Figure 2:
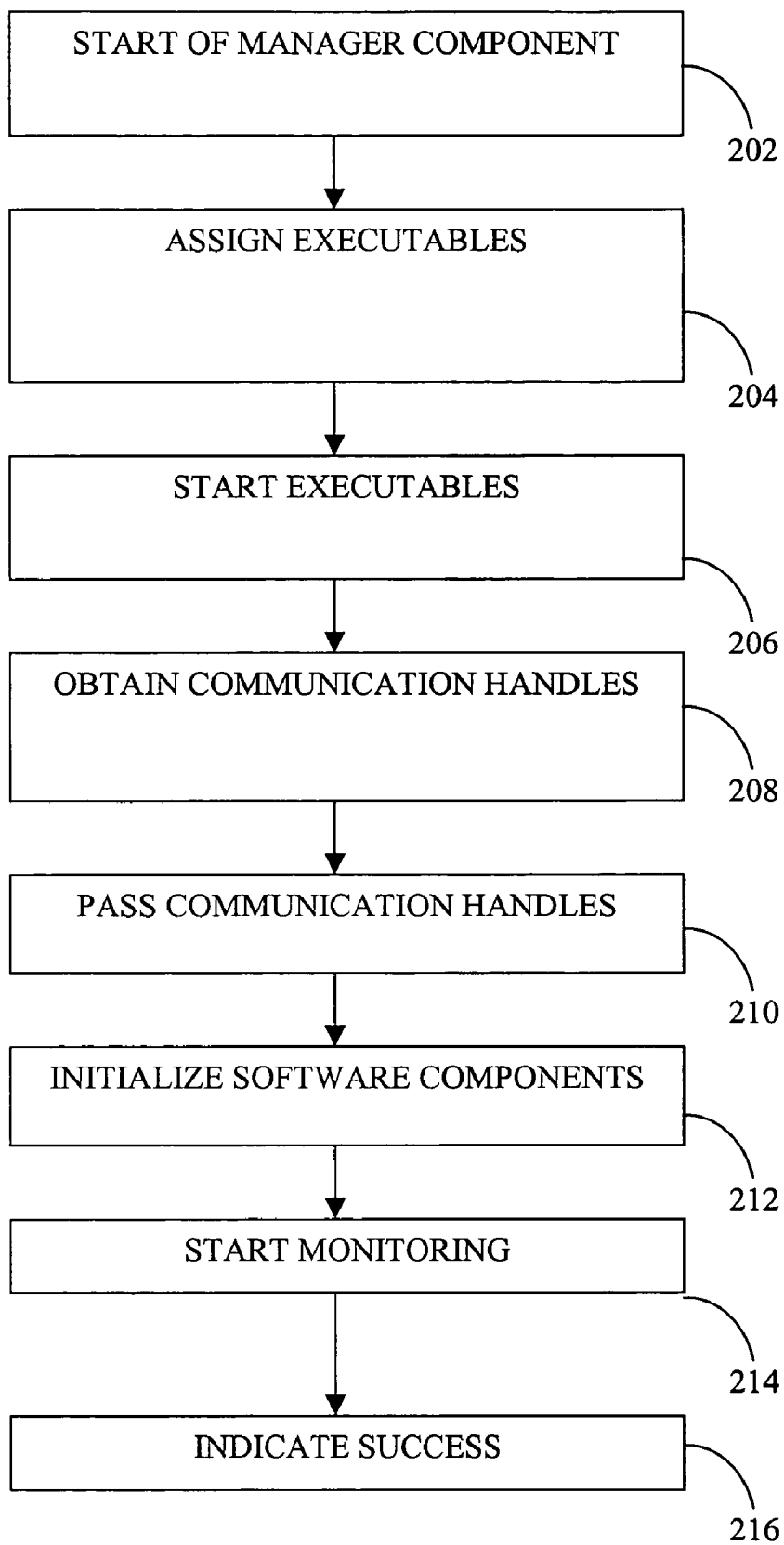
FIG. 2 is a representation of exemplary logic that serves to allow the manager component to initialize a plurality of software components of the distributed software application of the apparatus of FIG. 1.

Turning to FIGS. 1-2, an illustrative description of one exemplary operation of the apparatus 100 is now presented, for explanatory purposes. The executable 140 of the manager component 104 is executed (STEP 202), for example, by the external environment 151, to start the manager component 104. The manager component 104 receives a message from the external environment 151 to initialize the distributed software application 102. The manager component 104 employs the configuration file 150 to initialize the distributed software application 102. In one example, the manager component 104 receives the configuration file 150 in the message from the external environment 151. In another example, the manager component 104 obtains the configuration file 150, for example, from a disk drive or database, as will be appreciated by those skilled in the art. Once the manager component 104 has received and/or obtained the configuration file 151, the manager component 104 makes a determination of available processors for the distributed software application 102, for example, the processors 110 and 112. The manager component 104 in one example obtains a list of available processors from the configuration file 150.

Upon determination of the available processors, the manager component 104 assigns (STEP 204) executables of the distributed software application 102 to the available processors. For example, the manager component 104 assigns the executable 106 to the processor 110 and assigns the executable 108 to the processor 112. In one example, the executables comprise one or more limitations to which processor they may be executed on. In another example, the software components within the executables comprise limitations to which processor they may be executed on. The manager component 104 in one example obtains the limitations for the executables and/or software components from the configuration file 150. The manager component 104 in one example assigns the executables to the available processors based on the limitations of the executables and/or the software components within the executables. In another example, the manager component 104 assigns the executables to the available processors based on one or more load balancing limitations. For example, the manager component 104 assigns the executable 106 to the processor 110 and assigns the executable 108 to the processors 112 to promote an even distribution of computational load for the processors 110 and 112, as will be appreciated by those skilled in the art.

The manager component 104 starts (STEP 206) the executables 106 and 108 on the processors 110 and 112 through employment of the executable managers 114 and 116. The manager component 104 causes the processor 110 to start the executable 120 with the executable manager 114. The manager component 104 causes the processor 112 to start the executable 122 with the executable manager 116. In one example, the manager component 104 starts one executable manager per processor. In another example, the manager component 104 starts one active executable manager and one or more standby executable managers on a processor to promote an increase in redundancy of the high availability infrastructure.

The manager component 104 sends one or more messages to the executable managers 114 and 116 to start the executables 106 and 108. The messages comprise one or more parameters for execution of the executables 106 and 108. The executable managers 114 and 116 start the executables 106 and 108 on the processors 110 and 112, respectively.

Upon execution of the executables 106 and 108, the software components 124, 126, and 128 are created. Each software component 124, 126, and 128 comprises a communication handle, for example, a unique identifier. The manager component 104 receives (STEP 208) the communication handles for the software components 124, 126, and 128 from the executable managers 114 and 116. In one example, the manager component 104 stores the communication handles for the software components 124, 126, and 128 in the configuration file 150. In another example, the manager component 104 assigns the communication handles to data structures within the manager component 104 that correspond to the software components 124, 126, and 128. For example, the manager component 104 binds to the software components 124, 126, and 128.

The manager component 104 passes (STEP 210) the communication handles to the software components 124, 126, and 128, for example, to set up communication channels between the software components 124, 126, and 128. Once the software components 124, 126, and 128 have the communication handles, the manager component 104 initializes (STEP 212) the software components 124, 126, and 128 in an ordered sequence.

In one example, the software component 124 comprises a dependency relationship with the software component 128 and the software component 126. For example, the software component 124 is dependent on the software component 128 and the software component 126 is dependent on the software component 124. The manager component 104 makes a determination of the ordered sequence based on the dependency relationships. For example, the ordered sequence comprises the software component 128, followed by the software component 124, followed by the software component 126. The manager component 104 initializes the software components 124, 126, and 128 in the ordered sequence. For example, the manager component 104 performs an initialization of the software component 128. Upon completion of the initialization of the software component 128, the manager component 104 performs an initialization of the software component 124. Upon completion of the initialization of the software component 124, the manager component 104 performs an initialization of the software component 126, as will be appreciated by those skilled in the art.

In another example, the software component 124 comprises a dependency relationship with the software component 126. The software component 128 does not comprise a dependency relationship with the software components 124 or 126. The manager component 104 performs the initialization of the software components 124 and 128 concurrently, for example, in parallel. Parallel initialization of the software components 124 and 128 promotes a reduction in time needed for initialization of the distributed software application 102, as will be appreciated by those skilled in the art.

Upon initialization of the software components 124, 126, and 128, the manager component 104 causes the executable managers 114 and/or 116 to monitor (STEP 214) the software components 124, 126, and 128. For example, the manager component 104 sends a message to the executable manager 114. Upon receipt of the message, the executable manager 114 begins to monitor the software components 124 and 126. The manager component 104 sends another message to the executable manager 116. Upon receipt of the other message, the executable manager 116 begins to monitor the software component 128. Upon initiation of the monitoring of the software components 124, 126, and 128 by the executable managers 114 and 116, the manager component 104 sends (STEP 216) one or more messages to the software components 124, 126, and/or 128 to indicate success of the initialization of the distributed software application 102.

The manager component 104 in one example makes a determination of an initialization failure and handles the failure based on a pre-determined fault escalation specification. In one example, an active software component of an active/standby group of software components that is identified as critical to operation of the distributed software application 102 fails to initialize. The manager component 104 restarts one or more software components 124, 126, and/or 128 of the distributed software application 102. In another example, the manager component 104 restarts each of the software components 124, 126, and 128 upon a failure of the active critical software component of the distributed software application 102.

Where a standby software component of an active/standby group of software components that is critical to operation of the distributed software application 102 fails to initialize, the manager component 104 continues to initialize remaining software components of the distributed software application 102. Since the standby component is not currently in use (e.g. not active) by the distributed software application 102, the manager component 104 continues the distributed software application 102 in a simplex mode without the standby critical software component. The manager component 104 attempts to restart the standby critical software component, for example, upon an expiration of a pre-determined timer and/or an occurrence of a pre-determined event.

In one example where the software component 124 comprises a non-critical software component with a fault escalation specification described in the configuration file 150, the manager component 104 attempts to restart the software component 124 upon an expiration of a pre-determined timer and/or an occurrence of a pre-determined event. If the software component 124 comprises a non-critical software component and does not have a fault escalation specification, the manager component 104 identifies the software component 124 as unavailable. In one example, the manager component 104 identifies all software components within the executable of the unavailable software component to be unavailable.

The apparatus 100 in one example comprises a plurality of components such as one or more of electronic components, hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise recordable data storage medium of the manager component 104. The computer-readable signal-bearing medium for the apparatus 100 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A computer-readable signal-bearing medium that comprises one or more of a floppy disk, magnetic tape, CD-ROM, DVD-ROM, hard disk drive, or electronic memory that stores a software program for implementation of:
    a reusable management infrastructure for a distributed software application that is external to the reusable management infrastructure, wherein the distributed software application comprises application software of a plurality of software components within a plurality of executables that run on one or more processors;
    wherein the reusable management infrastructure comprises a manager component, management support software for the plurality of software components, and a configuration file;
    wherein the reusable management infrastructure employs a code generator and the configuration file to generate the management support software for the application software and to generate an application programming interface for communication between the management support software and the application software;
    wherein the manager component initializes at least two software components, of the plurality of software components, in an ordered sequence based on one or more dependency relationships among the at least two software components;
    wherein the manager component makes a determination of the ordered sequence based on the dependency relationships.

2. The computer-readable signal-bearing medium of claim 1, wherein the at least two software components comprise a first software component and a second software component that is dependent on the first software component;
    wherein the manager component causes an initialization of the first software component and an initialization of the second software component;
    wherein the manager component causes the initialization of the second software component upon a completion of the initialization of the first software component.

3. The computer-readable signal-bearing medium of claim 1, wherein the manager component initializes the at least two software components of the distributed software application in parallel.

4. The computer-readable signal-bearing medium of claim 1, wherein the manager component obtains the one or more dependency relationships from the configuration file.

5. The computer-readable signal-bearing medium of claim 1,
    wherein the manager component initializes the at least two software components on a plurality of processors that comprise the one or more processors.

6. The computer-readable signal-bearing medium of claim 5, wherein the manager component initializes one or more executable managers on the plurality of processors.

7. The computer-readable signal-bearing medium of claim 6, wherein the manager component signals the one or more executable managers to initialize the plurality of executables.

8. The computer-readable signal-bearing medium of claim 1, wherein the one or more dependency relationships comprise one or more of shared state information between the at least two software components, a communication channel between the at least two software components, or a dependency from an external environment.

9. A method, comprising the steps of: initializing, by a reusable management infrastructure for an external distributed software application, at least two software components of a plurality of software components of the external distributed software application on behalf of the external distributed software application in an ordered sequence based on one or more dependency relationships among the at least two software components, wherein the plurality of software components comprise application software within a plurality of executables that run on one or more processors, wherein the reusable management infrastructure comprises a manager component, management support software for the at least two software components, and a configuration file;
    making, by the manager component, a determination of the ordered sequence based an the dependency relationships;
    generating management support software for the application software of the external distributed software application through employment of the configuration file and a code generator;
    generating an application programming interface for communication between the management support software and the application software though employment of the configuration file and the code generator.

10. The method of claim 9, wherein the step of initializing the at least two software components of the plurality of software components of the external distributed software application on behalf of the external distributed software application, within the one or more executables, in the ordered sequence based on the one or more dependency relationships among the at least two software components comprises the steps of:
    making a determination of one or more available processors;
    assigning the one or more executables to the one or more available processors;
    initializing one or more executable managers on the one or more available processors; and
    initializing the one or more executables on the one or more available processors.

11. The method of claim 10, wherein the step of initializing the one or more executable managers on the one or more available processors comprises the step of:
    initializing one executable manager on each of the one or more available processors.

12. The method of claim 10, wherein the step of initializing the one or more executables on the one or more available processors comprises the step of:
    signaling, in the ordered sequence, the one or more executable managers to execute the one or more executables.

13. The method of claim 10, further comprising the step of:
    obtaining the one or more dependency relationships from a configuration file; and
    initializing the one or more executables in the ordered sequence based on the one or more dependency relationships from the configuration file and/or one or more load characteristics of the one or more available processors.

14. The method of claim 10, further comprising the steps of:
    obtaining one or more communication handles for one or more of the at least two software components; and
    passing one or more of the one or more communication handles to one or more of the at least two software components to set up one or more communication channels among the at least two software components.

15. The method of claim 14, wherein the step of initializing the one or more executables on the one or more available processors comprises the step of:
    initializing the at least two software components within the one or more executables in the ordered sequence, wherein the at least two software components comprise one or more active components;
the method further comprising the steps of:
    initializing one or more standby components associated with the one or more active components.

16. The method of claim 9, further comprising the step of:
    making a determination of an initialization failure of an active critical software component of the at least two software components;
    performing a shutdown of the at least two software components; and
    restarting the step of initializing the at least two software components of the distributed software application upon the determination of the initialization failure of the active critical software component.

17. The method of claim 9, further comprising the step of:
    making a determination of an initialization failure of a standby critical software component of the at least two software components; and
    restarting an initialization of the standby critical software component of the at least two software components upon the determination of the initialization failure of the standby critical software component.

18. The method of claim 9, further comprising the steps of:
    making a determination of an initialization failure of a non-critical software component of the at least two software components;
    restarting an initialization of the non-critical software component where the non-critical software component comprises a fault escalation specification; and
    marking the non-critical software component as unavailable where the non-critical software component does not comprise a fault escalation specification.

19. A computer-readable signal-bearing medium that comprises one or more of a floppy disk, magnetic tape, CD-ROM, DVD-ROM, hard disk drive, or electronic memory that stores a software program for implementation of:
    a reusable high availability infrastructure in communication with an external distributed software application that comprises a plurality of software components within a plurality of executables that run on one or more processors;
    wherein the high availability infrastructure comprises a manager component responsible for at least two software components of the plurality of software components, management support software for the one or more software components, and a configuration file;
    wherein the manager component causes an initialization of the at least two software components in an ordered sequence based on one or more dependency relationships among the at least two software components;
    wherein the manager component makes a determination of the ordered sequence based on the dependency relationships;
    wherein the reusable high availability infrastructure employs a code generator and the configuration file to generate the management support software for the application software and to generate an application programming interface for communication between the management support software and the application software.

20. The computer-readable signal-bearing medium of claim 19, wherein the high availability infrastructure generates one or more management support components for the at least two software components;
    wherein the manager component employs the one or more management support components to cause the initialization of the at least two software components in the ordered sequence.

* * * * *